3,063,947
HIGH ALTITUDE BRUSH
Walter G. Krellner, St. Marys, Pa., assignor to Stackpole Carbon Company, St. Marys, Pa., a corporation of Pennsylvania
No Drawing. Filed May 1, 1961, Ser. No. 106,476
4 Claims. (Cl. 252—506)

This invention relates to dynamoelectric brushes for use in sliding contact with metallic current collecting elements of dynamoelectric machines. The term "dynamoelectric brushes" as used herein contemplates brushes such as the well known carbon and electrographitic types and is so used herein.

Brushes of this type comprise a body of electrically conductive carbonaceous material such, for example, as graphite, coke, or other forms of carbon, e.g. lampblack. The carbonaceous material in finely divided form is mixed with a temporary binder, such as pitch or resin, and the mixture is molded to form plates or blocks that are subsequently heated with production of a residual carbon bond resulting from the binder. In the case of electrographitic products the heating is carried out at a temperature sufficient to convert the carbonaceous material to graphite, for instance at temperatures above about 2700° C. The nature, composition and modes of producing such brushes are well known in the trade.

Brushes of the type just alluded to that perform satisfactorily at the earth's surface have been produced for many years. Of recent years, however, with the advent of high altitude aircraft brushes of this general type were found to become subject to severe and rapid wear at high altitudes, or under conditions of low humidity, with great reduction of their operating life, even to but a few minutes in extreme cases. This phenomenon has occasionally been termed dusting.

Various means have been proposed for increasing the life of dynamoelectric brushes at high altitudes such, for example, as embodying in the brushes various inorganic substances including non-hygroscopic halides, barium compounds, lithium salts, molybdenum sulfide and others. In general brushes containing such adjuvants suffer from the disadvantage that before their life at high altitudes will be satisfactory they must be subjected to a film-forming conditioning by being run in under normal atmospheric conditions. For instance, brushes containing those adjuvants if installed in a newly assembled generator with unused commutator surfaces and taken immediately to high altitude will promptly undergo dusting. In the case of such brushes, therefore, the consistent practice has been to run in the metallic current collecting elements against the brushes for periods up to many hours at earth level. This involves, obviously, delays in production of dynamoelectric devices for use in aircraft at high altitudes or under conditions of very low humidity coupled with the economic disadvantages involved.

Although some adjuvants intended to afford satisfactory life at high altitudes are available, and brushes with them can be used without a pre-filming run, they also suffer from certain disadvantages. For example, they may tend to build up an objectionably thick film upon commutators or slip rings. Also some adjuvants require two or more impregnations using in some cases corrosive acids, or they can not be supplied to the brush by impregnation but must be included in the original mix, which rules out the possibility of using them in electrographitic brushes. Still another proposal has been to supply the adjuvant as small plugs mounted in the brush faces but this again is not a fully satisfactory answer because of the tendency for the filming from the plugs to be non-uniform and for selective wear of the commutator or collector ring to occur.

Primary objects of the present invention are to provide dynamoelectric brushes which give improved life at high altitudes; which do not require preliminary conditioning or breaking in prior to use; which are produced easily from readily available material using standard apparatus; which brushes may be made from the various base compositions used for making dynamoelectric brushes; and which avoid the disadvantages of prior brushes just referred to.

Other objects will be recognized from the following specification.

The invention is predicated upon my discovery that dynamoelectric brushes containing chromium potassium sulfate (chrome alum, $[KCr(SO_4)_2]$) do not require any pre-filming in order to operate with satisfactory life at high altitudes or under conditions of low humidity, thereby avoiding disadvantages, such as those mentioned above, of the various previously known high altitude brushes. In other words, a major advantage of the brushes of this invention is that they may be installed for operation with untreated commutators, or other current collecting elements, and immediately taken to high altitude and operated there without impairment of their desirable qualities whereby the objectionable conditioning of such brushes that has heretofore been necessary is entirely eliminated.

Brushes in accordance with this invention are produced by impregnating a plate or block of material for making dynamoelectric brushes, produced in accordance with standard practice, with an aqueous solution of chrome alum. For this purpose there may be used the anhydrous salt or the dodecahydrate.

In one mode of producing these brushes the plate or block may be merely immersed in the chrome alum solution for a period of time sufficient to permit the salt to be distributed through the porous material. This practice may in some instances not produce as uniform impregnation as, and may be slower than, the preferred practice now to be described.

In this practice the brush stock is placed in a vacuum apparatus which is then evacuated, for instance to a pressure of the order of 10 mm. of mercury, whereupon there is introduced an aqueous solution of chrome alum in an amount at least enough to cover the stock. When the stock has been impregnated with the solution it is removed and dried.

If desired, pressure may be applied to the solution through the medium of air or another gas that is inert to the brush material and the impregnant. A pressure of about 70 p.s.i. suffices for many purposes.

Impregnation by vacuum alone or in combination with pressure is a well known procedure for various purposes and has been applied in this particular art to effect impregnation of these materials with adjuvants. Higher or lower degrees of evacuation and other pressures can be used, as will be understood.

The impregnating step is conducted to supply to the brush at least about 2 percent by weight of chrome alum on the anhydrous basis. Larger amounts may be supplied if desired for special purposes, say up to 20 percent, but in general it is preferred that the brush contain 3 to 4 percent by weight, which gives protection against rapid wear at high altitude equal to that obtained with about 8 to 15 percent by weight of the previously used adjuvants.

For the purposes of the invention it has been found that a solution of 40 parts by weight of the hydrated chrome alum in 60 parts by weight of water gives sufficient impregnation to confer the required altitude protection. However, stronger or weaker solutions may be used. A single impregnation suffices for most purposes although a second impregnation may be used if desired for any particular reason.

After the brush has been thus impregnated it is removed from the apparatus and dried. If the hydrated alum is desired in the brush it is heated up to 400° F. When it is desired to have the chrome alum in the anhydrous form in the finished brush, the brushes should be dried by heating to at least about 750° F. with satisfactory results to be had by heating in the range 900° to 1000° F., although still higher temperatures may be used. The heating will, of course, be carried out for a period of time sufficient to thoroughly dry the brush. This will depend upon the heating temperature and the mass of the brush although for most purposes for use in aircraft heating at the temperatures stated for four hours effects adequate drying.

As evidencing the superiority of brushes made in accordance with this invention reference may be made to the so-called bell jar test described in U.S. Patent No. 2,739,912, granted March 27, 1956, on an application filed by Paul Smisko. In this test the brushes are run for 30 minutes against a slip ring device in a bell jar through which there is circulated air dried to a dew point below minus 90° C. They are then heated to 300° C. for a minimum of 15 minutes after which they are reinstalled in the bell jar which is evacuated to a pressure of the order of 0.1 mm. mercury with heat lamps applied during about 20 hours to draw off gas or vapor from within the apparatus. The vacuum is then adjusted to various simulated altitudes to determine that at which dusting would occur. In the present case the tests were started on a slip ring which had not been filmed or conditioned by a run-in period. Under these conditions it requires about 7 to 8 percent by weight of the best prior known adjuvants to prevent dusting at the 35,000 foot level. With brushes in accordance with the present invention 2 to 3 percent by weight of the chrome alum on the anhydrous basis suffices to prevent dusting up to the 45,000 foot level, and with 4 percent of chrome alum dusting was not produced at the 60,000 foot level, which was the limit of the bell jar test apparatus available.

Experience has shown that a further advantage of the brushes of this invention is that they produce uniform filming of current collecting surfaces.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A dynamoelectric brush capable of prolonged life at high altitude as prepared and without preliminary operation at normal atmospheric conditions, the brush consisting essentially of a carbon bonded body of electrically conducting carbonaceous material having, by weight, from about 2 to 20 percent of potassium chromium sulfate, calculated as the anhydrous salt, distributed throughout the body.

2. A brush in accordance with claim 1 containing about 3 to 4 percent of said sulfate.

3. A dynamoelectric brush capable of prolonged life at high altitude as prepared and without preliminary operation at normal atmospheric conditions, the brush consisting essentially of a body of graphite having, by weight, from about 2 to 20 percent of potassium chromium sulfate, calculated on the anhydrous basis, distributed throughout the body.

4. A brush according to claim 3 containing about 3 to 4 percent of said sulfate.

References Cited in the file of this patent

UNITED STATES PATENTS 2,417,702   Ramadanoff _____ Mar. 18, 1947

OTHER REFERENCES

Rose: "The Condensed Chemical Dictionary," Fifth Ed., Reinhold Pub. Corp., N.Y., 1956, pp. 277 and 279.